310-334 SR
XR 3,365,590

Jan. 23, 1968 D. D. LOBDELL 3,365,590
PIEZOELECTRIC TRANSDUCER
Filed Aug. 19, 1965

INVENTOR
DONN D. LOBDELL
BY A. C. Smith
ATTORNEY

United States Patent Office 3,365,590
Patented Jan. 23, 1968

3,365,590

PIEZOELECTRIC TRANSDUCER

Donn D. Lobdell, Palo Alto, Calif., assignor to Hewlett-Packard Company, Palo Alto, Calif., a corporation of California Filed Aug. 19, 1965, Ser. No. 480,997
5 Claims. (Cl. 310—8.2)

Figure 1:
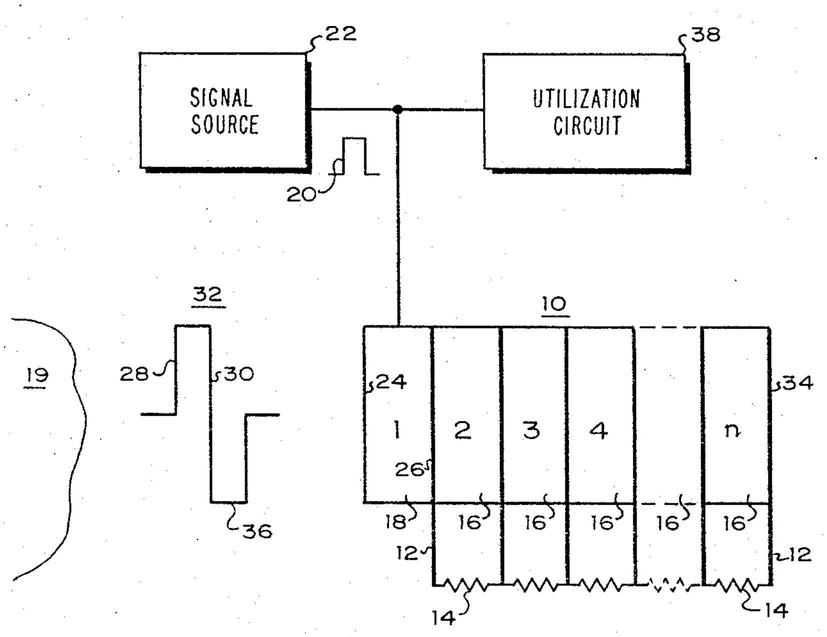

This invention relates to ultrasonic transducers, and more particularly to a transducer including a piezoelectric crystal and means for attenuating selected ultrasonic signals produced thereby.

The transducers used in ultrasonic scanning systems typically include a piezoelectric crystal for sending an acoustical signal to the body under test and receiving back a reflected acoustical signal therefrom. It is desirable that the piezoelectric crystal send a single acoustical pulse of small duration to the body under test so that the critical time interval between sending the acoustical pulse and receiving the reflected acoustical pulse can be precisely determined. In practice, however, the piezoelectric crystal produces and sends a plurality of acoustical pulses of similar amplitude because of internal reflections resulting from the acoustical impedance mismatch between the opposite planar surfaces of the piezoelectric crystal and the surrounding medium. Since objects other than the body under test may reflect these similar-amplitude acoustical pulses it is difficult to distinguish between the reflected acoustical pulses, and the accuracy with which the critical time period can be determined is correspondingly impaired. Thus, it is desirable to attenuate all but one of the acoustical pulses produced by the piezoelectric crystal.

One conventional method of providing the desired attenuation is to place a passive scattering device comprising, for example, a lossy mixture of tungsten powder and epoxy, against one of the parallel planar surfaces of the piezoelectric crystal. If this lossy scattering device is acoustically matched to the piezoelectric crystal, it directly attenuates all but one of the acoustical pulses produced thereby. However, one cannot be certain of obtaining a good acoustical match between the piezoelectric crystal and the passive scattering device since this depends upon such critical factors as curing time, composition, and homogeneity of the mixture forming the scattering device. Failure to obtain a good acoustical match results in acoustical ringing which seriously impairs the accuracy of determination of the critical period.

Accordingly, it is the principal object of this invention to provide a piezoelectric crystal and a better matched attenuator therefor to permit greater accuracy of determination of the critical time interval.

Another object of this invention is to provide an ultrasonic attenuator which is matched to a piezoelectric crystal for attenuating, by any desired factor, the ultrasonic signals produced by the piezoelectric crystal.

Still another object of this invention is to provide a piezoelectric transducer which is responsive to an input signal for producing a discrete output signal.

In accordance with the illustrated embodiment of this invention there is provided an ultrasonic transducer comprising a piezoelectric crystal for producing ultrasonic signals in response to an input signal. An ultrasonic attenuator comprising a plurality of serially connected piezoelectric crystals with an electrode abutting upon each of the opposite parallel planar faces of these piezoelectric crystals is serially connected to one of the parallel planar faces of the first-mentioned piezoelectric crystal. A resistor is connected between each adjacent pair of electrodes to provide a plurality of attenuator sections for successively attenuating by means of the piezoelectric effect all but one of the ultrasonic signals produced by the first-mentioned piezoelectric crystal.

Figure 2:
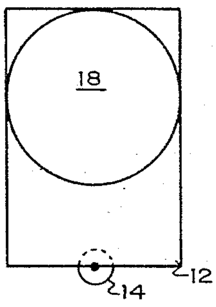

Other and incidental objects of this invention will become apparent from a reading of this specification and an inspection of the accompanying drawing in which:

FIGURE 1 shows a piezoelectric transducer according to the present invention, and FIGURE 2 is a front view of the transducer of FIGURE 1.

Referring now to FIGURES 1 and 2, the ultrasonic transducer 10 comprises $n$ axially aligned piezoelectric crystals each having a pair of opposite planar surfaces, and each being serially connected to the other by an electrode 12. The $n$th piezoelectric crystal also terminates in an electrode 12 which is serially connected thereto. The electrodes 12 form continuous air tight junctions with the planar surfaces of the piezoelectric crystals abutting thereon over the entire area of the planar surfaces. These electrodes 12 may be thin steel strips since steel is a sufficiently good conductor and is well matched to the piezoelectric crystals. A resistor 14 is connected between each adjacent pair of electrodes 12. In this manner the second through the $n$th piezoelectric crystals 16 are connected to form a plurality of $n-1$ identical attenuator sections for the first piezoelectric crystal 18.

When used in ultrasonic scanning applications, to determine the structural characteristics of a body 19 under test the first piezoelectric crystal 18 of ultrasonic transducer 10 is connected to receive an electrical pulse 20 from signal source 22. This electrical pulse 20 deforms the first piezoelectric crystal 18 causing it to generate a positive-going acoustical step signal in the forward direction and a negative-going acoustical step signal in the backward direction from planar surface 24. Similarly, the first piezoelectric crystal 18 generates a negative-going acoustical step signal in the forward direction and a positive-going acoustical step signal in the backward direction from planar surface 26. The positive-going and negative-going acoustical step signals 28 and 30 which are generated in the forward direction toward the body 19 combine to form a single positive-going pulse 32, the duration of which corresponds to the thickness of the first piezoelectric crystal 18. The positive-going and negative-going acoustical step signals which are generated in the backward direction are successively attenuated by the $n-1$ attenuator sections. Since all of the attenuator sections comprise piezoelectric crystals 16 the attenuator is necessarily well matched to the first piezoelectric crystal 18 which serves as both a transmitter and a receiver for the transducer 10. Because of the piezoelectric effect, as the acoustical step signals generated in the backward direction away from the body 19 are transmitted through the attenuator, each of the second through the $n$th piezoelectric crystals 16 successively generates a voltage which is dissipated across the corresponding resistor 14, thereby reducing the energy of the acoustical step signals. Thus, when the backward moving acoustical pulse is finally reflected due to the acoustical impedance mismatch at the rear surface 34 of the attenuator, it is greatly reduced in amplitude by a selected factor. Furthermore, it is reduced again by the same factor as it is transmitted back through the attenuator to the first piezoelectric crystal 18 and the surrounding medium.

The duration of the electrical pulse 20 is selected so that the trailing edge of the electrical pulse corresponds in time with the trailing edge 30 of the acoustical pulse 32. In this manner the negative-going acoustical pulse 36, which is generated by the restoration of the first piezoelectric crystal 18 to its original steady state condition when the electrical input signal 20 is removed therefrom, occurs immediately after the termination of the positive-going acoustical pulse 32. This permits improved depth resolution. The acoustical pulses 32 and 36 are reflected from body 19 because of the acoustical impedance mismatch between the body 19 and the surrounding medium. These reflected signals from body 19 are received by the first piezoelectric crystal 18 which generates corresponding voltage signals. A utilization circuit 38 is connected to the first piezoelectric crystal 18 to receive these voltage signals. Since all other signals generated by the first piezoelectric crystal 18 are greatly attenuated, the critical time interval between sending and receiving an acoustical signal to the body 19 can be accurately determined. It is also important to note that the attenuator, comprising piezoelectric crystals 16, attenuates the reflected acoustical pulses from body 19 after the desired information has been extracted therefrom so as to again reduce the problems created by internal reflections within piezoelectric crystal 18.

I claim:

1. An ultrasonic attenuator comprising:

a plurality of piezoelectric crystals each having a pair of oppositely facing surfaces;

a plurality of electrodes;

said piezoelectric crystals and said electrodes being serially joined together with each of said oppositely facing surfaces of each of said piezoelectric crystals abutting continuously upon one of said electrodes; and an electrical energy dissipating element connected between each adjacent pair of said electrodes.

2. In a transducer including a first piezoelectric crystal having a pair of oppositely facing surfaces and being adapted for at least one of receiving and generating ultrasonic signals, an ultrasonic attenuator having at least one section comprising:

a second piezoelectric crystal having a pair of oppositely facing surfaces and being coaxially and serially coupled to said first piezoelectric crystal;

a pair of electrodes;

each of said electrodes continuously contacting a different one of the oppositely facing surfaces of said second piezoelectric crystal;

one of said electrodes also continuously contacting one of the oppositely facing surfaces of said first piezoelectric crystal; and an electrical energy dissipating element connected between said electrodes for reducing the energy of selected ones of said ultrasonic signals.

3. An ultrasonic transducer for producing a discrete signal in response to an electrical input signal, said transducer comprising:

first and second axially aligned piezoelectric crystals each having a pair of oppositely facing surfaces;

said first piezoelectric crystal generating forward and backward ultrasonic signals in response to electrical input signal;

a pair of electrodes each of which continuously contacts a different one of the oppositely facing surfaces of said second piezoelectric crystal;

one of said electrodes also continuously contacting one of the oppositely facing surfaces of said first piezoelectric crystal; and an electrical energy dissipating element connected between said electrodes for reducing the energy of said backward ultrasonic signal.

4. An ultrasonic transducer for receiving an ultrasonic signal, said transducer comprising:

first and second axially aligned piezoelectric crystals each having a pair of oppositely facing surfaces;

said first piezoelectric crystal being adapted to receive said ultrasonic signal;

a pair of electrodes each of which continuously contacts a different one of the oppositely facing surfaces of said second piezoelectric crystal;

one of said electrodes also continuously contacting one of the oppositely facing surfaces of said first piezoelectric crystal; and an electrical energy dissipating element connected between said electrodes for reducing the energy of said ultrasonic signal after it is received by said first piezoelectric crystal.

5. An ultrasonic transducer comprising:

a first piezoelectric element for at least one of receiving and generating an ultrasonic signal;

a second piezoelectric element serially joined to said first piezoelectric element;

a pair of electrodes attached to opposite sides of said second piezoelectric element; and an electrical energy dissipating element connected between said electrodes to attenuate an ultrasonic signal from said first piezoelectric element by means of the piezoelectric effect.

References Cited

UNITED STATES PATENTS

| | | | |
|---|---|---|---|
| 2,607,216 | 8/1952 | Mason | 310—9.6 |
| 2,941,110 | 6/1960 | Vando | 310—8.7 |
| 3,154,720 | 10/1964 | Cooperman | 310—9.6 |
| 3,246,164 | 4/1966 | Richmond | 310—8.1 |

MILTON O. HIRSHFIELD, *Primary Examiner.*

J. D. MILLER, *Examiner.*